US012088688B2

(12) United States Patent
Liao et al.

(10) Patent No.: US 12,088,688 B2
(45) Date of Patent: Sep. 10, 2024

(54) PACKET PROCESSING METHOD, NETWORK DEVICE, AND RELATED DEVICE

(71) Applicant: HUAWEI TECHNOLOGIES CO., LTD., Guangdong (CN)

(72) Inventors: Zhijian Liao, Chengdu (CN); Jincheng Bao, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/153,618

(22) Filed: Jan. 12, 2023

(65) Prior Publication Data

US 2023/0156102 A1    May 18, 2023

Related U.S. Application Data

(63) Continuation of application No. PCT/CN2021/107828, filed on Jul. 22, 2021.

(30) Foreign Application Priority Data

Jul. 23, 2020   (CN) .......................... 202010716127.9

(51) Int. Cl.
    *H04L 69/16*     (2022.01)
(52) U.S. Cl.
    CPC .................................. *H04L 69/161* (2013.01)

(58) Field of Classification Search
    CPC ..................................................... H04L 69/161
    See application file for complete search history.

(56) References Cited

U.S. PATENT DOCUMENTS

| 7,826,350 | B1 | 11/2010 | Michailidis et al. |
| 9,952,979 | B1 | 4/2018 | Mukherjee |
| 2004/0013117 | A1 | 1/2004 | Hendel et al. |
| 2004/0190516 | A1 | 9/2004 | Williams |
| 2006/0080707 | A1* | 4/2006 | Laksono ............ H04L 12/2805 725/38 |
| 2011/0258337 | A1 | 10/2011 | Wang et al. |
| 2014/0181249 | A1* | 6/2014 | Saeki .................. H04L 67/1097 709/217 |
| 2015/0039651 | A1* | 2/2015 | Kinsely ................ G06F 16/254 707/779 |
| 2018/0219805 | A1 | 8/2018 | Macneil et al. |
| 2020/0084300 | A1* | 3/2020 | Dutta ...................... H04L 69/22 |

FOREIGN PATENT DOCUMENTS

| CN | 101616194 A | 12/2009 |
| CN | 104506379 A | 4/2015 |
| CN | 107547623 A | 1/2018 |

* cited by examiner

*Primary Examiner* — Zhiren Qin

(74) *Attorney, Agent, or Firm* — HUAWEI TECHNOLOGIES CO., LTD.

(57) ABSTRACT

In a packet processing method, a network device receives a packet of an application running in a server connected to the network device. The network device separates data of the application from the packet, and writes the data of the application into a memory allocated in the server to the application.

14 Claims, 9 Drawing Sheets

PACKET PROCESSING METHOD, NETWORK DEVICE, AND RELATED DEVICE

CROSS-REFERENCE TO RELATED APPLICATIONS

This application is a continuation of International Application No. PCT/CN2021/107828, filed on Jul. 22, 2021, which claims priority to Chinese Patent Application No. 202010716127.9, filed on Jul. 23, 2020. The disclosures of the aforementioned priority applications are hereby incorporated by reference in their entirety.

TECHNICAL FIELD

This application relates to the communications field, and in particular, to a packet processing method, a network device, and a related device.

BACKGROUND

A transmission control protocol (TCP) is one of core protocols of the Internet. Because the TCP protocol can ensure integrity and reliability of data communication, the TCP protocol is widely applied to a scenario that has a relatively high requirement on accuracy, for example, a file transfer scenario. A TCP application may implement a file transfer function based on a file transfer protocol (FTP) and a hypertext transfer protocol (HTTP) in a TCP protocol group. For another example, in a scenario of sending or receiving an email, the TCP application may implement a function of sending and receiving an email based on a simple mail transfer protocol (SMTP) or an interactive mail access protocol (IMAP) in the TCP protocol group.

However, when a server that performs data communication based on the TCP protocol receives a TCP packet, an external network interface card connected to the server usually first receives the packet. After the external network interface card writes the packet into a network interface card driver memory of the server, the TCP application obtains data of the application in the packet from the network interface card driver memory, and then copies the data of the application into an application memory. The redundant copy step causes high memory usage for TCP packet processing, and processing efficiency is limited.

SUMMARY

This application provides a packet processing method, a network device, and a related device, to reduce memory usage in a packet processing process and improve packet processing efficiency.

According to a first aspect, a packet processing method is provided. The method is applied to a network device, and the network device is connected to a server. The method includes the following steps: receiving a packet of an application running in the server; separating data of the application from the packet; and writing the data of the application into a memory allocated in the server to the application.

By implementing the method described in the first aspect, before writing the packet into the server, the network device first separates the data of the application from the packet, and then writes the data of the application into the application memory. In an entire packet processing process, the data of the application does not need to be copied repeatedly, thereby reducing memory usage in the packet processing process and improving packet processing efficiency.

In a possible implementation, the method further includes: separating a packet header and metadata of the data of the application from the packet; and storing the packet header and the metadata of the data of the application into a memory allocated by the server to a driver of the network device.

By implementing the foregoing implementation, after separating the data of the application from the packet, the network device also separates the packet header and the metadata of the data of the application from the packet, then writes the data of the application into the application memory, and writes the packet header and the metadata of the data of the application into a network interface card driver memory. In this way, a TCP application of the server may determine, based on the metadata in the network interface card driver memory, an application memory address in which the data of the application should be stored, and then exchange a memory page in which the data of the application is located with a memory page corresponding to the application memory address, to complete one data communication process. In this method, a case of a plurality of times of packet copying is avoided in a process in which the packet is transmitted from the network device to the memory page of the TCP application, to improve packet processing efficiency and reduce memory usage.

In a possible implementation, the separating data of the application from the packet includes: separating the data of the application from the packet based on a delimitation template, where the delimitation template defines a rule of separation between the data of the application and other data in the packet.

It should be understood that metadata of a same application is generated according to a uniform rule. Therefore, delimitation templates of a same application are the same, delimitation templates of different applications may be the same or different, and the delimitation template may also be determined according to a metadata generation rule. After the application is started, the application may deliver, to the network device, a delimitation template corresponding to an application type of the application.

Optionally, if a length of the metadata of the TCP application is uniform: L1, and a length of the packet header of the packet is also fixed, data whose length is L1 after the packet header is the metadata. If a length of the data of the application is determined as L2 based on the metadata, data whose length is L2 after the metadata is the data of the application, so that the data of the application is separated from the packet.

Optionally, if the metadata of the TCP application uniformly ends with a particular delimiter, for example, the delimiter may be a line break, a space character, or a colon, the delimitation template may obtain the metadata based on the delimiter, and then separate the data of the application from the packet based on the data length that is of the application and that is described in the metadata. Similarly, if the length of the packet header of the packet is fixed, data after the packet header and before the delimiter is the metadata. After the length L2 of the data of the application is determined based on the metadata, the data whose length is L2 after the metadata is the data of the application, so that the data of the application is separated from the packet.

By implementing the foregoing implementation, after generating the delimitation template according to the metadata generation rule, the TCP application delivers the delimitation template to the network device, so that the network device can split the packet based on the delimitation template, separate the data of the application from the packet, and write the data of the application into the application memory. A redundant step of copying the data of the application into the application memory after the packet is written into the server is avoided, memory usage in the packet processing process is reduced, and packet processing efficiency is improved.

In a possible implementation, the receiving a packet of an application running in the server includes: aggregating a plurality of sub-packets belonging to a same data stream into the packet, where source internet protocol IP addresses and destination IP addresses of the plurality of sub-packets belonging to the same data stream are the same.

By implementing the foregoing implementation, after the network device aggregates the plurality of packets belonging to the same data stream, a quantity of to-be-processed packets is reduced, and a quantity of times of writing the packet into the server by the network device is also reduced, so that packet processing efficiency of the network device is improved.

In a possible implementation, before the separating data of the application from the packet, the method further includes: determining that the packet includes complete data in one data stream.

By implementing the foregoing implementation, for a network device that supports a TCP offload engine (TOE) function, TCP protocol processing, such as out-of-order processing, congestion control, and retransmission, may be performed in advance inside the network device. A packet obtained after protocol processing is performed includes complete data in one data stream. It may be understood that, after the network device determines that the packet includes complete data in one data stream, in this case, cases such as disorder and repetition do not occur in the packet. In this case, the packet is split by using the delimitation template, so that packet splitting accuracy can be improved.

According to a second aspect, a packet processing method is provided. The method is applied to a server, and the server is connected to a network device. The method includes the following steps: The server receives data that is of an application and that is sent by the network device, and stores the data of the application into a memory allocated by the server to the application, receives a packet header and metadata of the data of the application that are sent by the network device, and stores the packet header and the metadata of the data of the application into a memory allocated by the server to a driver of the network device, then the server determines whether the data of the application in the memory allocated in the server to the application is complete, and when the data of the application is complete, the server determines an application memory address of the data of the application based on the metadata of the data of the application, and exchanges a memory page corresponding to the address with a memory page in which the data of the application is located, so that the data of the application is stored into the application memory address.

In a specific implementation, memory page exchange may mean exchanging a pointer pointing to the data of the application with a pointer pointing to the application memory address, or replacing a virtual address of the memory page in which the data of the application is located with the application memory address. A specific implementation of memory page exchange is not limited in this application.

By implementing the method described in the second aspect, a TCP application running in the server confirms the application memory address of the data of the application based on the metadata, and then exchanges the application memory page corresponding to the application memory address with the memory page in which the data of the application is located. In this way, resource waste caused by copying the data of the application for a plurality of times is avoided, and packet processing efficiency is improved.

In a possible implementation, before determining the application memory address of the data of the application based on the metadata, the server may further determine, based on a delimitation template, whether the packet header, the metadata of the data of the application, and the data of the application that are written into the server by the network device are complete data of a same data stream. When determining that the packet header, the metadata of the data of the application, and the data of the application that are written into the server by the network device are complete data, the server determines the application memory address of the data of the application based on the metadata; or when determining that the packet header, the metadata of the data of the application, and the data of the application that are written into the server by the network device are not complete data, the server obtains the data of the application and the application memory address of the data of the application based on the packet header, the metadata of the data of the application, and the metadata that are written into the server by the network device, and then copies the data of the application to the application memory address.

Because a packet received by the network device may be out of order, duplicated, or the like, in this case, when the network device separates the data of the application from the packet, a case in which the separated data of the application is incomplete may occur. Therefore, after the network device writes the data of the application into the server, the application may reconfirm, based on the delimitation template, whether the data of the application is complete. The delimitation template herein is the same as the delimitation template used when the network device splits the packet. For example, the TCP application may obtain the metadata based on the delimitation template, for example, determine the metadata based on a delimiter, or determine the metadata based on a fixed length of the metadata, and then obtain a length of the data of the application based on the metadata. If the length is the same as a length of the data that is of the application and that is written into the application memory, it indicates that the network device correctly splits the packet. Otherwise, if the data length is different from the length of the data that is of the application and that is written into the application memory, it indicates that the network device incorrectly splits the packet. It should be understood that the process in which the TCP application determines, based on the delimitation template, whether the network device correctly splits the packet is used as an example for description. This is not limited in this application.

By implementing the foregoing implementation, the server re-splits the packet header, the metadata of the data of the application, and the data of the application by using the delimitation template, to avoid a case in which data finally written into the application memory address is incomplete due to a split error of the network device, thereby improving data transmission reliability.

According to a third aspect, a network device is provided. The network device is connected to a server, and the network device includes: a receiving unit, configured to receive a packet of an application running in the server; a separation unit, configured to separate data of the application from the packet; and a writing unit, configured to write the data of the application into a memory allocated in the server to the application.

In a possible implementation, the separation unit is further configured to separate a packet header and metadata of the data of the application from the packet; and the writing unit is further configured to store the packet header and the metadata of the data of the application into a memory allocated by the server to a driver of the network device.

In a possible implementation, the separation unit is configured to separate the data of the application from the packet based on a delimitation template, where the delimitation template defines a rule of separation between the data of the application and other data in the packet.

In a possible implementation, the receiving unit is configured to aggregate a plurality of sub-packets belonging to a same data stream into the packet, where source internet protocol IP addresses and destination IP addresses of the plurality of sub-packets belonging to the same data stream are the same.

In a possible implementation, the network device further includes a determining unit, configured to determine that the packet includes complete data in one data stream before the separation unit separates the data of the application from the packet.

According to a fourth aspect, a server is provided. The server is connected to a network device, and the server includes: an application module, configured to: receive data that is of an application and that is sent by the network device, and store the data of the application into a memory allocated by the server to the application; a network interface card driver, configured to: receive a packet header and metadata of the data of the application that are sent by the network device, and store the packet header and the metadata of the data of the application into a memory allocated by the server to a driver of the network device; and a kernel protocol stack, configured to determine whether the data of the application in the memory allocated in the server to the application is complete; and the application module is further configured to: when the data of the application is complete, determine an application memory address of the data of the application based on the metadata of the data of the application, and exchange a memory page corresponding to the address with a memory page in which the data of the application is located, so that the data of the application is stored into the application memory address.

In a possible implementation, the application module is further configured to: before an exchange unit determines the application memory address of the data of the application based on the metadata, determine, based on a delimitation template, whether the packet header, the metadata of the data of the application, and the metadata that are written into the server by the network device are complete data of a same data stream; when determining that the packet header, the metadata of the data of the application, and the data of the application that are written into the server by the network device are complete data, determine the application memory address of the data of the application based on the metadata; or when determining that the packet header, the metadata of the data of the application, and the data of the application that are written into the server by the network device are not complete data, obtain the data of the application and the application memory address of the data of the application based on the packet header, the metadata of the data of the application, and the metadata that are written into the server by the network device, and then copy the data of the application to the application memory address.

According to a fifth aspect, a packet processing system is provided, including a server and a network device. The server is configured to implement the operation steps of the method described in the second aspect or any possible implementation of the second aspect. The network device is configured to implement the operation steps of the method described in the first aspect or any possible implementation of the first aspect.

According to a sixth aspect, a computer program product is provided, including a computer program. When the computer program is read and executed by a computing device, the method described in the first aspect or the second aspect is implemented.

According to a seventh aspect, a computer-readable storage medium is provided, including instructions. When the instructions run on a computing device, the computing device is enabled to implement the method described in the first aspect or the second aspect.

According to an eighth aspect, a network device is provided, including a processor and a communications interface. The communications interface is configured to receive a packet, and the processor is configured to perform the method described in the first aspect to process the packet.

According to a ninth aspect, a server is provided, including a processor and a memory. The processor executes code in a storage area to implement the method described in the second aspect.

BRIEF DESCRIPTION OF DRAWINGS

To describe the technical solutions in embodiments of this application more clearly, the following briefly describes the accompanying drawings for describing embodiments.

DESCRIPTION OF EMBODIMENTS

Figure 1:
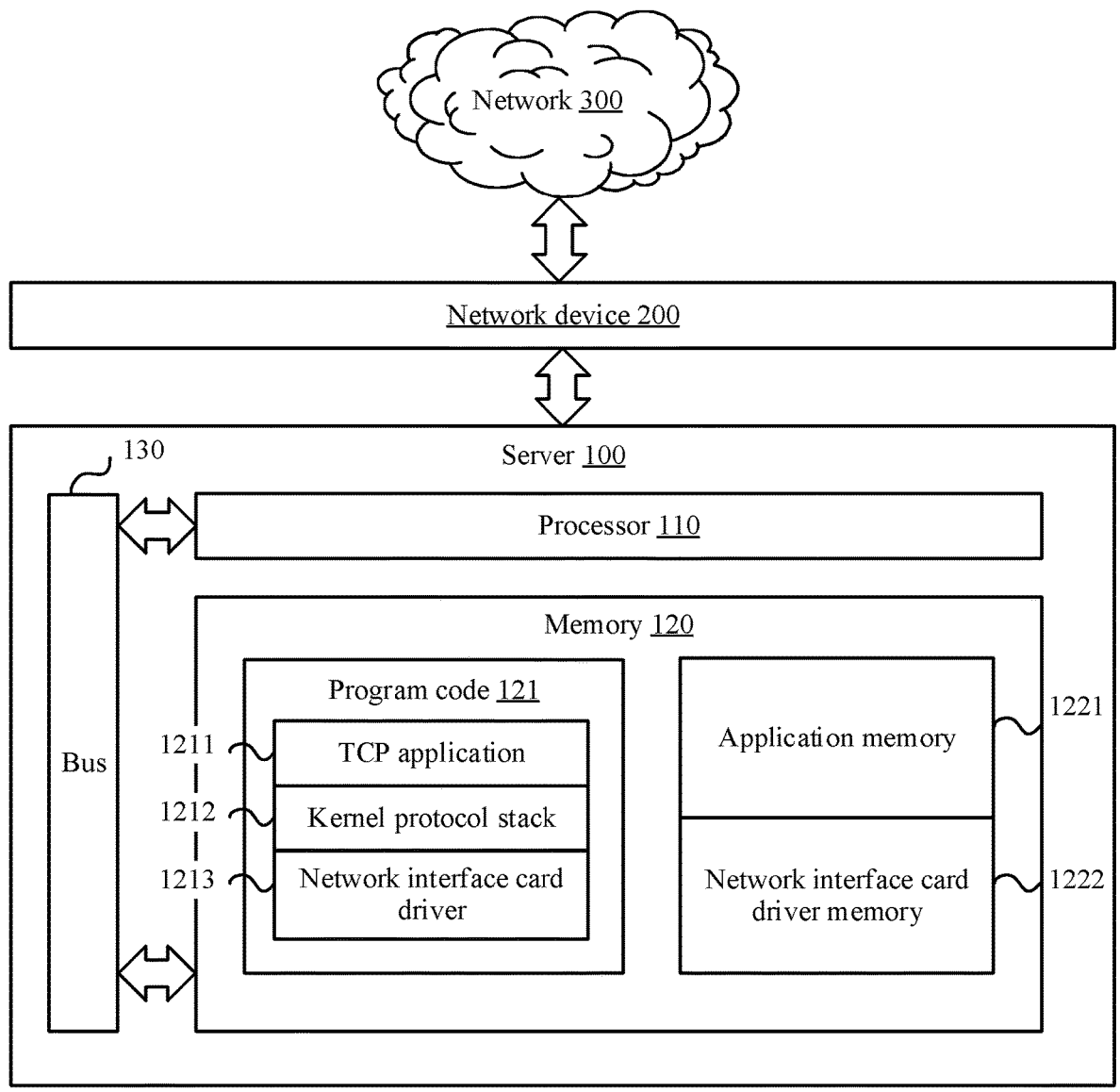
FIG. 1 is a schematic diagram of a structure of a packet processing system according to this application.

First, some terms in this application are explained and described. It should be noted that terms used in embodiments of this application are only used to explain specific embodiments of this application, but are not intended to limit this application.

Protocol stack: is a specific software implementation of a computer network protocol suite. A protocol in the protocol suite is usually designed only for one purpose, and this can make the design easier. Because each protocol module usually communicates with two other protocol modules above and below the protocol module, the protocol modules may be usually imagined as layers in the protocol stack. A lowest-level protocol always describes physical interaction with hardware. For example, three computers are respectively A, B, and C. Both the computer A and the computer B have radio devices and can communicate by using a network protocol IEEE 802.11, and the computer B and the computer C exchange data through cable connections, such as Ethernet. In this way, data between the computer A and the computer C can be transmitted only by using the computer B, and cannot be directly transmitted. To resolve this problem, a new protocol, for example, an IP protocol, may be established on two protocols. In this way, two protocol stacks are formed, to implement data communication between the computer A and the computer C.

TCP: The TCP provides a connection-oriented reliable byte stream service. The TCP packs user data into a to-be-processed packet. When sending data, the TCP starts a timer. After receiving the data, the other end performs confirmation, then rearranges out-of-order data, and discards duplicate data. Therefore, TCP-based data communication has high security and reliability, and is widely applied to a scenario that has a relatively high requirement on accuracy, for example, a file transfer scenario. A TCP application may implement a file transfer function based on a file transfer protocol (FTP) and a hypertext transfer protocol (HTTP) in a TCP protocol group. In another example, in a scenario of sending or receiving an email, the TCP application may implement a function of sending and receiving an email based on a simple mail transfer protocol (SMTP) or an interactive mail access protocol (IMAP) in the TCP protocol group. It should be understood that the foregoing types of the TCP application are merely used as examples for description. A packet processing solution provided in this application is applicable to any TCP application, and the TCP application is not limited in this application.

Direct memory access (DMA): A device directly processes packets of a computer memory, so that the DMA device directly accesses the server memory, and shortens a packet processing path, so that not only I/O performance of the server is improved, but also load pressure of a CPU is reduced.

Memory page: An address space of a memory is artificially divided into several parts of equal sizes, where one part corresponds to one memory page, and a processor writes and reads the memory in units of pages.

TOE: The TOE usually includes software and hardware components, extends functions of a conventional TCP/IP protocol stack, and transfers all TCP protocol processing work of network data traffic to integrated hardware of a network interface card. A server undertakes only a processing task of a TCP/IP application, so that processing pressure of the server is reduced.

First, an application scenario to which this application is applicable is explained and described.

FIG. 1 is a schematic diagram of a structure of a server connected to a network. The server 100 is connected to a network device 200, and the network device 200 is connected to a network 300. When another server in the network 300 sends a to-be-processed packet to the server 100, the network device 200 first receives the to-be-processed packet, and then sends the to-be-processed packet to the server 100. After processing the to-be-processed packet, the server 100 completes packet processing once.

The network device 200 is a hardware device that connects the server 100 to the network 300, and may be specifically a network interface card (NIC) or a TOE network interface card. This is not specifically limited in this application. One server 100 may be connected to one or more network devices 200. An example in which the server 100 is connected to one network device 200 is used for description in FIG. 1. This is not limited in this application.

The server 100 is a general-purpose physical server, such as an ARM server or an X86 server. The server 100 includes a processor 110 and a memory 120. The processor 110 and the memory 120 are connected to each other by using an internal bus 130. The internal bus 130 may be a peripheral component interconnect (PCI) bus, an extended industry standard Architecture (EISA) bus, or the like. It should be noted that FIG. 1 is merely a possible implementation of the server 100. During actual application, the server 100 may further include more or fewer components. This is not limited herein.

The processor 110 may include at least one general-purpose processor, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 110 executes various types of digital storage instructions, such as software or firmware programs stored in the memory 120, and can enable the server 1 to provide a wide variety of services.

The memory 120 may be a volatile memory, for example, a random access memory (RAM), a dynamic random access memory (DRAM), a static random access memory (SRAM), a synchronous dynamic random access memory (SDRAM), a double data rate synchronous dynamic random access memory (DDR), or a cache. The memory 120 may further include a combination of the foregoing types. The memory 120 includes program code 121. The program code 121 may include code of one or more software modules, such as a TCP application 1211, a kernel protocol stack 1212, and a network interface card driver 1213 that are shown in FIG. 1. The TCP application 1211 is an application module that implements various functions based on the TCP protocol. The kernel protocol stack 1212 may be understood as a part of the operating system, and is mainly configured to process a packet in the kernel protocol stack. The network interface card driver 1213 is a special program that can enable a CPU to control and use the network device 200 (for example, an NIC or a TOE network interface card), and is equivalent to a hardware interface of the network device 200. The operating system may control the network device 200 by using the interface. The memory 120 further includes an application memory 1221 and a network interface card driver memory 1222. The network interface card driver memory 1222 is a segment of memory applied by the network interface card driver 1213 from the memory 120. The kernel protocol stack 1212 may process data in the network interface card driver memory 1222. The application memory 1221 is a segment of memory applied by the TCP application 1211 from the memory 120, and the TCP application 1211 may process data in the application memory 1221.

Figure 2:
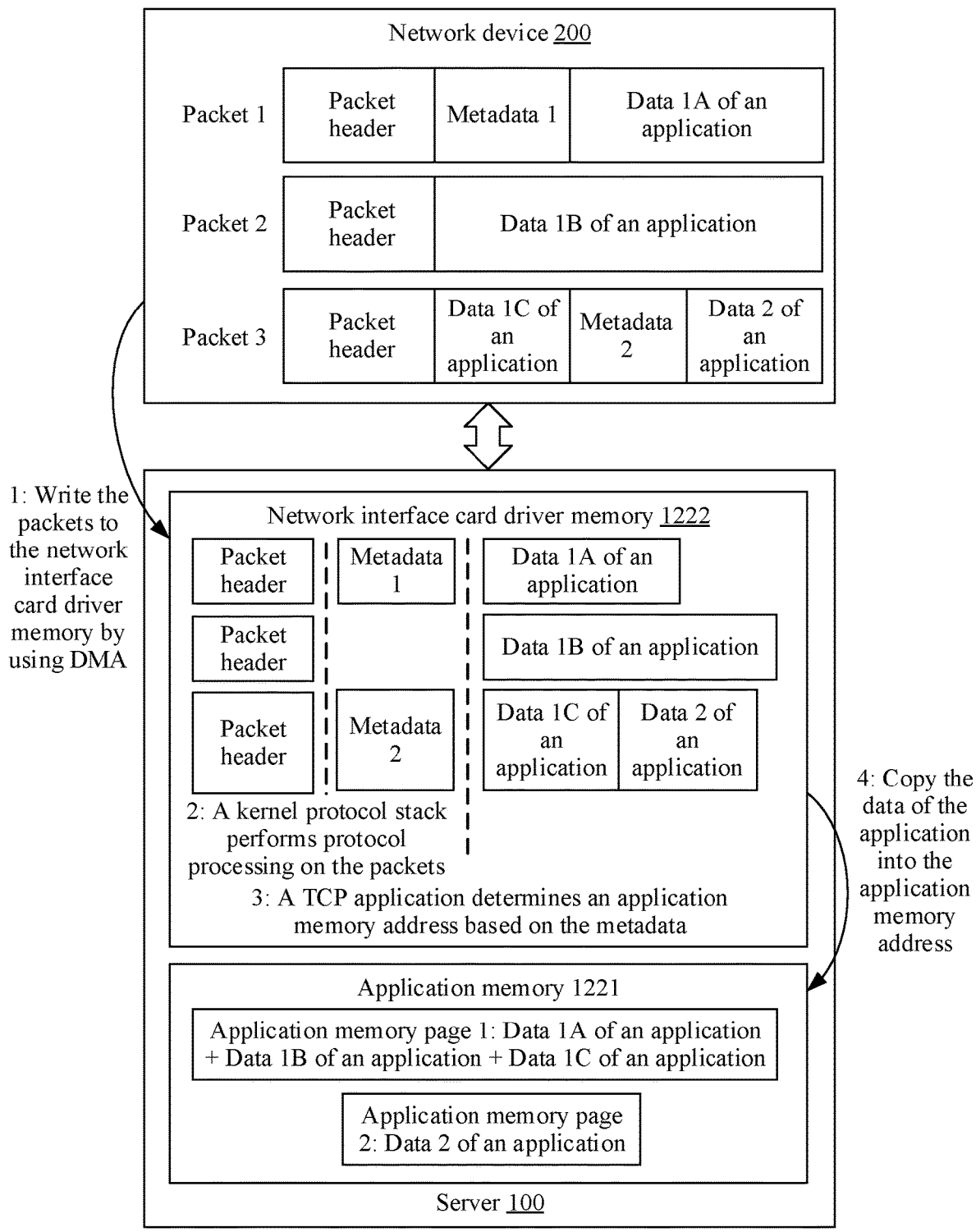
FIG. 2 is a schematic flowchart of steps of a packet processing method in the related technology.

With reference to FIG. 2, the following describes a specific process in which the server 100 in FIG. 1 receives and processes a TCP packet from the network 300 in the related technology.

When another server sends data to the server 100, the network device 200 first receives a TCP packet from the network 300. The TCP packet includes a packet header, metadata, and data of an application. As shown in FIG. 2, the packet header is located before the metadata, and the metadata is located before the data of the application.

The packet header includes at least four-tuples (a source IP address, a destination IP address, a source port, and a destination port). It should be understood that four-tuples in packet headers of to-be-processed packets of a same TCP stream are the same.

The metadata includes at least a length of the data of the application and control information of the data of the application. The control information is used by the TCP application to determine an application memory address of the data of the application. For example, the control information may include context information. After receiving the packet, the TCP application may determine, based on the context information, that application memory addresses in which context data D1 and D3 of the data D2 of the application in the packet are located are respectively Add 1 and Add 3, to determine that the application memory address of the data of the application is Add 2. Add 1, Add 2, and Add 3 are a continuous segment of memory. In a specific implementation, the application memory address determined by the TCP application based on the metadata may be an address of a particular memory page in the application memory 1221. Specific forms of the metadata and the application memory address that is determined based on the metadata are not limited in this application.

The data of the application is raw data sent by another server to the server 100, namely, payload. It should be understood that, usually, during data transmission, to make data transmission more reliable, some auxiliary information, such as a data amount and a parity bit, is added to a header and/or a tail of the raw data, so that the raw data is not easily lost in a transmission process. The raw data and the auxiliary information form a basic transmission unit of a transmission channel, namely, a data frame, a data packet, a TCP/IP packet, or the like. The raw data is the data of the application.

It should be understood that, because a size of each TCP packet is fixed, usually approximately 1480 bytes, if a large amount of data needs to be sent at a time, the data needs to be fragmented and then divided into a plurality of packets for transmission. For example, a 10 MB file needs to be fragmented into more than 7100 packets for transmission. When a transmitter-side server sends a packet, the TCP protocol numbers each packet (SEQ), so that a receiver-side server restores the received plurality of packets to the original 10 M file based on the SEQ sequence. FIG. 2 is described by using an example in which data 1 of the application is fragmented into three pieces of data of the application (data 1A of the application, data 1B of the application, and data 1C of the application). A packet 1 includes a packet header, metadata 1, and the data 1A of the application, a packet 2 includes a packet header and the data 1B of the application, and a packet 3 includes a packet header, the data 1C of the application, metadata 2, and data 2 of the application. The metadata 1 includes control information of the data 1 of the application (the data 1A of the application, the data 1B of the application, and the data 1C of the application). The TCP application may determine an application memory address of the data 1 of the application based on the control information, the metadata 2 includes control information of the data 2 of the application, and the TCP application may determine an application memory address of the data 2 of the application based on the control information. Assuming that the packet 1, the packet 2, and the packet 3 belong to a same TCP stream, four-tuples of packet headers of the packet 1, the packet 2, and the packet 3 are the same, but SEQs of the data 1 of the application in the packet 1, the packet 2, and the packet 3 are different.

In the foregoing application scenario, as shown in FIG. 2, after the network device 200 receives the packet 1, the packet 2, and the packet 3, a specific process in which the server shown in FIG. 1 receives and processes the TCP packet from the network 300 includes the following steps.

Step 1: The network device 200 writes the packet 1, the packet 2, and the packet 3 into the network interface card driver memory 1222 of the server 100 by using a DMA technology.

In a specific implementation, the network interface card driver memory 1222 is a segment of memory applied by the network interface card driver 1213 from the server 100. After writing the packets into the network interface card driver memory 1222 by using the DMA technology, the network device 200 may send a protocol processing request to the kernel protocol stack, where the protocol processing request includes addresses of the packets.

Step 2: The kernel protocol stack 1212 performs TCP protocol processing on the packets in the network interface card driver memory 1222.

Specifically, after receiving the protocol processing request sent by the network interface card driver, the kernel protocol stack 1212 may perform TCP protocol processing on the packets based on the addresses of the packets in the protocol processing request, to ensure integrity of data communication.

In a specific implementation, because a length and a format of a packet header are fixed, for example, the length of the packet header is 20 kb, the kernel protocol stack 1212 may start to read 20 kb data from a header of a memory page of the network interface card, to obtain the packet header of the packet; then the kernel protocol stack 1212 completes TCP protocol processing steps such as congestion control, out-of-order processing, and retransmission based on the packet header, and rearranges out-of-order data and discards duplicate data, to ensure that all packets in the TCP stream corresponding to the packet headers are already written into the server.

For example, as shown in FIG. 2, the kernel protocol stack 1212 performs TCP protocol processing on the packet headers, and determines, based on the SEQs in the packet headers, whether the packets 1 to 3 are all already written into the network interface card driver memory 1222. If the packet 2 is lost, the kernel protocol stack 1212 may send, to the network device, a request for retransmitting the packet 2, and when confirming that no packet is lost, the kernel protocol stack 1212 sends an application processing request to the TCP application, where the application processing request includes the addresses of the packets.

Step 3: The TCP application processes the metadata in the network interface card driver memory 1222, to determine an application memory address of the data of the application.

Figure 3A:
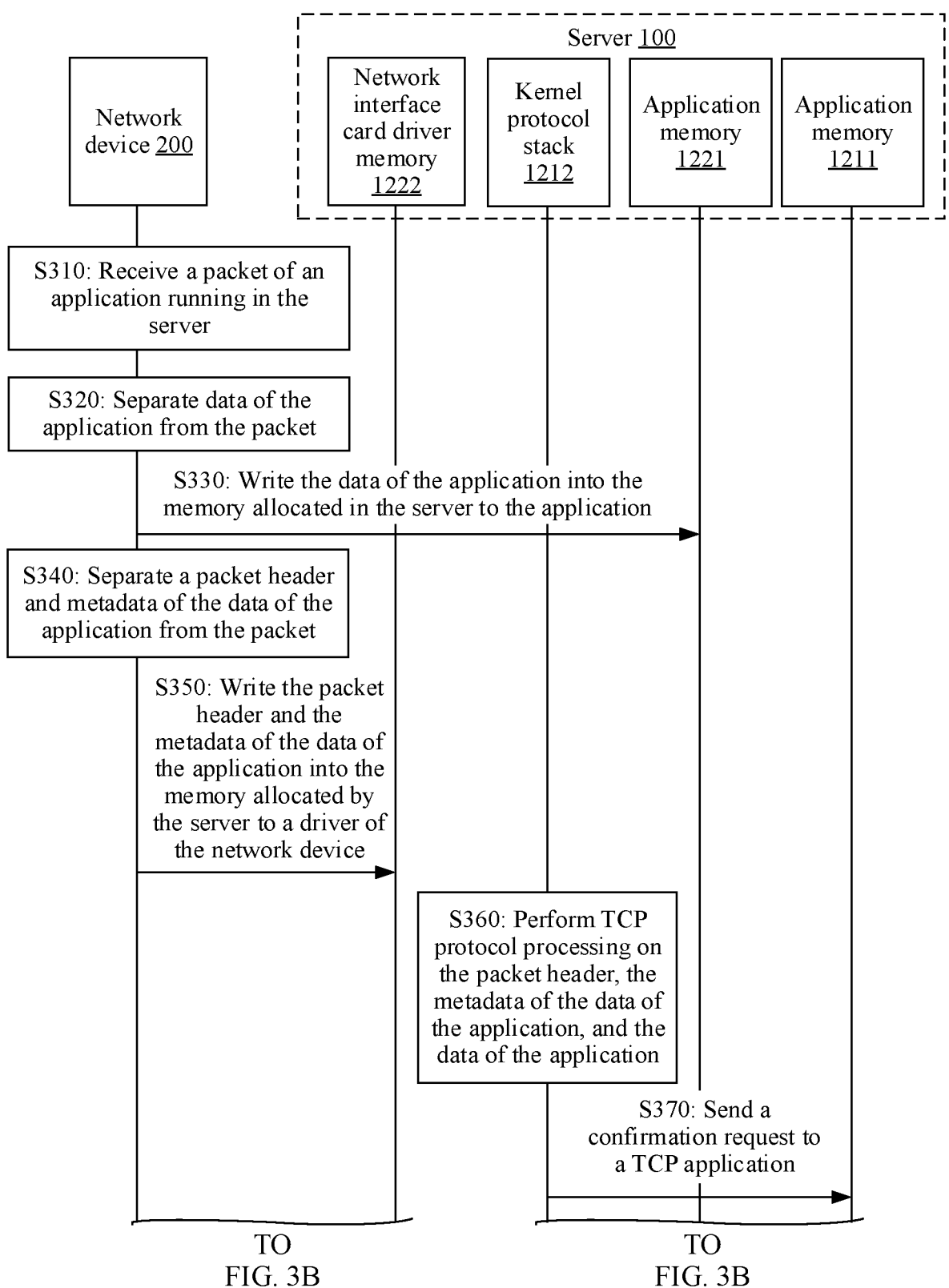
FIG. 3A and FIG. 3B are a schematic flowchart of steps of a packet processing method according to this application.
Figure 3B:
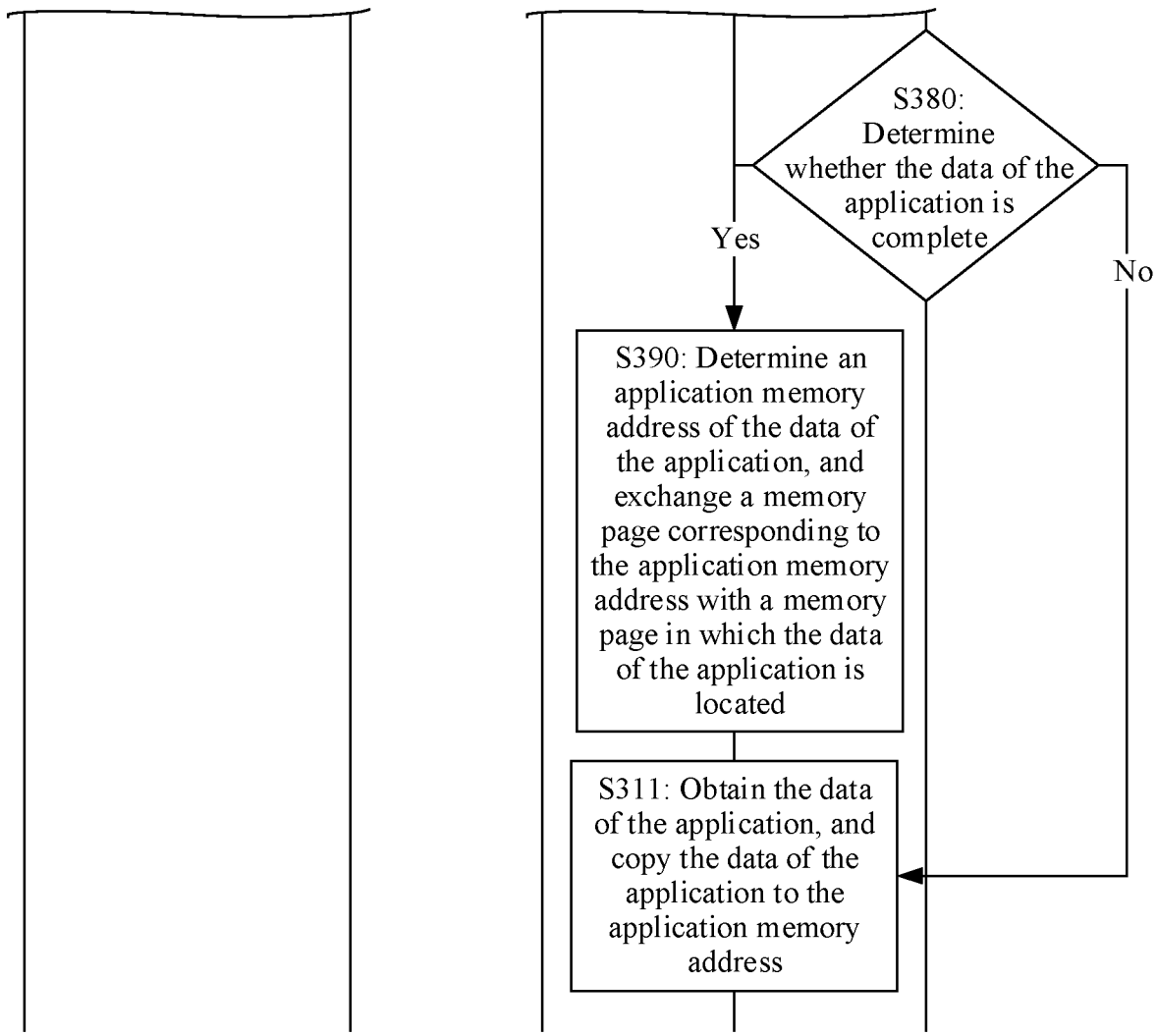

Specifically, each piece of metadata of the data of the application is generated based on a fixed format, and the metadata may be obtained based on a format characteristic of the metadata. If the length of the metadata is fixed, after receiving the application processing request sent by the kernel protocol stack, the TCP application first reads, based on the length of the metadata, for example, 40 kb, 40 kb data behind the packet header into a metadata memory, where the 40 kb data is the metadata, and then the metadata is parsed to determine a length of the data of the application and an application memory address. If a special symbol, such as a line break, a space character, or a colon, that is used as a delimiter exists at the tail of the metadata, after receiving the application processing request sent by the kernel protocol stack, the TCP application first determines a location of the delimiter, then reads data after the packet header and before the delimiter into the metadata memory, and then parses the metadata to determine the length of the data of the application and the application memory address. The metadata memory may be a segment of memory that is applied by the TCP application in advance from the memory and that is used to temporarily store the metadata. After parsing the metadata in the metadata memory of the application, the TCP application may delete the metadata in the memory, to release a storage space. It should be understood that FIG. 3A and FIG. 3B are merely used as an example for description. In a specific implementation, the metadata may further include more content. Examples are not described herein one by one for description.

Step 4: The TCP application copies the data of the application in the network interface card driver memory 1222 into the application memory address.

Still using FIG. 3A and FIG. 3B as an example, after confirming, based on the metadata, that the length of the data of the application is 1400 kb and the application memory address of the data of the application is Add 1, the TCP application may copy 1400 kb data after the 40 kb metadata into Add 1. The 1400 kb data is the data of the application required by the TCP application.

In conclusion, it can be learned that after the network device 200 externally connected to the server 100 receives the TCP packet, the network device 200 writes, by using the DMA technology, the packet into the network interface card driver memory 1222 that is divided in advance by the server for the network interface card driver. The kernel protocol stack 1212 of the server 100 first processes the packet in the network interface card driver memory 1222, and then copies the data of the application in the packet into the application memory 1221. Briefly, the packet needs to be written into the network interface card memory first, and then the TCP application copies the data of the application in the packet from the network interface card memory into the application memory. The redundant copy step causes high memory usage for TCP packet processing, and processing efficiency is limited.

To resolve the foregoing problem that memory usage is high and processing efficiency is limited during TCP packet processing, this application provides a packet processing method. As shown in FIG. 3A and FIG. 3B, the method includes the following steps.

S310: A network device 200 receives a packet of an application running in a server 100.

In an embodiment, the packet of the application may be a packet received by the network device 200, for example, the packet 1, the packet 2, or the packet 3 in FIG. 2, or may be a packet obtained by performing, by the network device 200, packet aggregation on a plurality of received sub-packets that belong to a same data stream (for example, a TCP flow). Source IP addresses and destination IP addresses of the plurality of sub-packets that belong to the same data stream are the same. The network device 200 may determine a plurality of packets of a same TCP stream based on four-tuples in a TCP header of each packet. The four-tuples of the plurality of packets in the same TCP stream are the same. Then, the plurality of packets that belong to the same TCP stream are aggregated into one packet. The packet also includes a TCP packet header, metadata, and data of the application. Each piece of metadata is closely followed by data that is of an application and that corresponds to the metadata, and each piece of data of the application is closely followed by a next piece of metadata of the data of the application.

Figure 5:
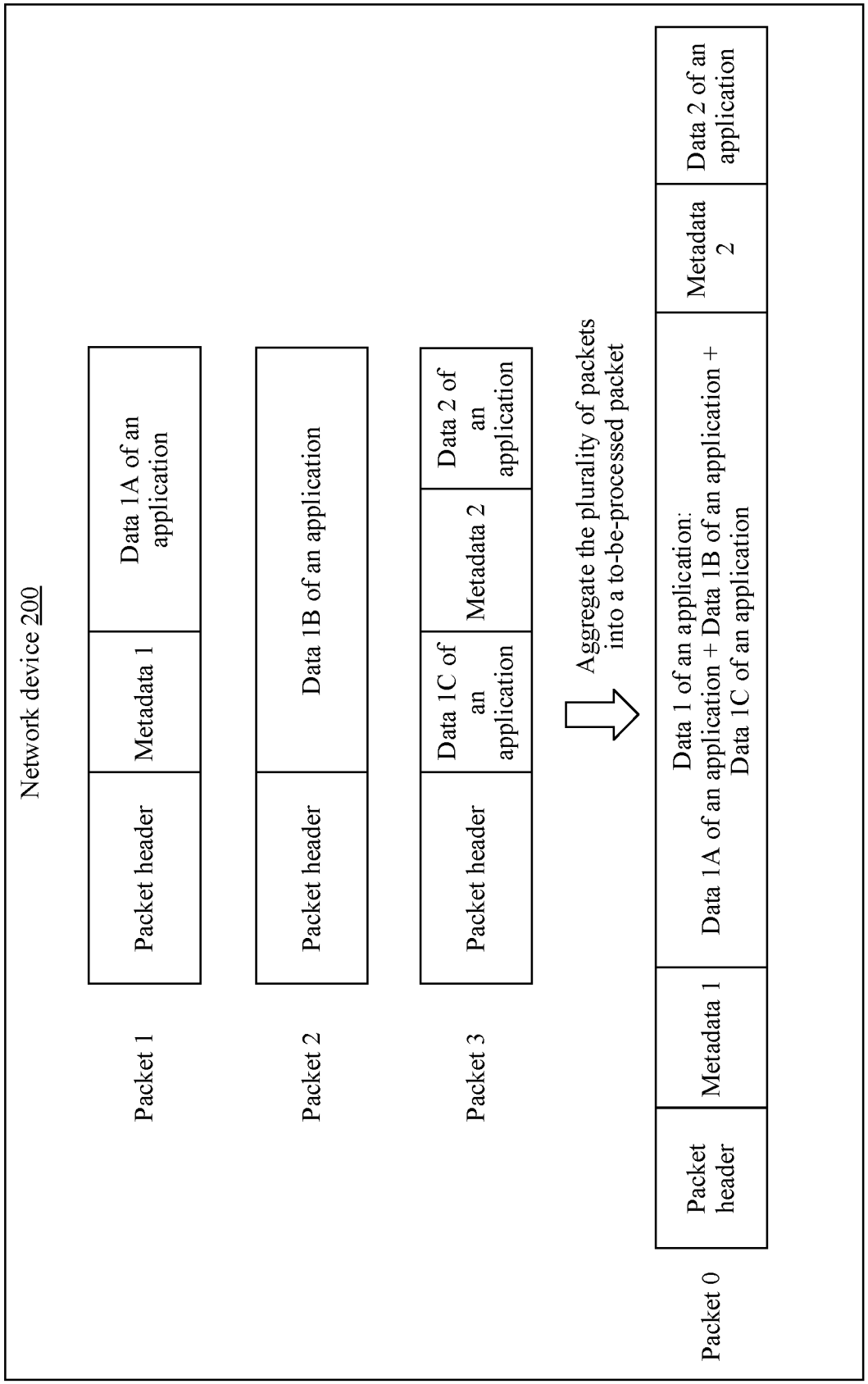
FIG. 5 is a schematic flowchart of steps of packet aggregation according to this application.

Assuming that the network device 200 receives the packets 1 to 3 shown in FIG. 2, and the packets 1 to 3 are three packets belonging to a same TCP stream, a packet 0 obtained by aggregating the packets 1 to 3 by the network device 200 may be shown in FIG. 5. Data 1 of the application includes data 1A of the application in the packet 1, data 1B of the application in the packet 2, and data 1C of the application in the packet 3. In a specific implementation, the network device 200 may implement packet aggregation by using algorithms such as large receive offload (LRO) and receive side coalescing (RSC). This is not specifically limited herein. It may be understood that, after the network device 200 aggregates a plurality of packets belonging to a same TCP stream, a quantity of times of writing a packet into a server by the network device 200 can be reduced, and packet processing efficiency of the network device 200 can be improved.

S320: The network device 200 separates data of the application from the packet.

In an embodiment, the network device 200 may separate the data of the application from the packet based on a delimitation template, where the delimitation template defines a rule of separation between the data of the application and other data in the packet. It should be understood that, because the packet received by the network device 200 is a packet on which TCP protocol processing is not performed, the packet may be an out-of-order packet or a lost packet. In this case, when the packet is split by using the delimitation template, a split error may occur. To be specific, data that is of the application and that is obtained through splitting is incomplete, for example, includes only some data of the application, or includes other data in addition to the data of the application. When the network device 200 correctly splits the packet, the separated data of the application includes only complete data of the application, and the remaining packet includes only a complete packet header and complete metadata.

Metadata of a same TCP application is generated based on a uniform rule. Delimitation templates of a same TCP application are the same, and delimitation templates of different TCP applications may be the same or different. Therefore, before step S310, and when the TCP application is started, a delimitation template corresponding to an application type of the TCP application may be delivered to the network device 200. Specifically, the TCP application may send an interface invocation request to a driver (for example, a network interface card driver) of the network device 200. The driver of the network device 200 responds to the request and provides an interface of the network device 200 for the TCP application. The TCP application invokes the interface to deliver the delimitation template to the network device 200.

For ease of better understanding of this application, for example, the following describes delimitation templates corresponding to two metadata formats by using examples.

In the first delimitation template, if a length of the metadata of the TCP application is uniform: L1, and a length of the packet header of the packet is also fixed, data whose length is L1 after the packet header is the metadata. If a length of the data of the application is determined as L2 based on the metadata, data whose length is L2 after the metadata is the data of the application, so that the data of the application is separated from the packet.

Figure 4:
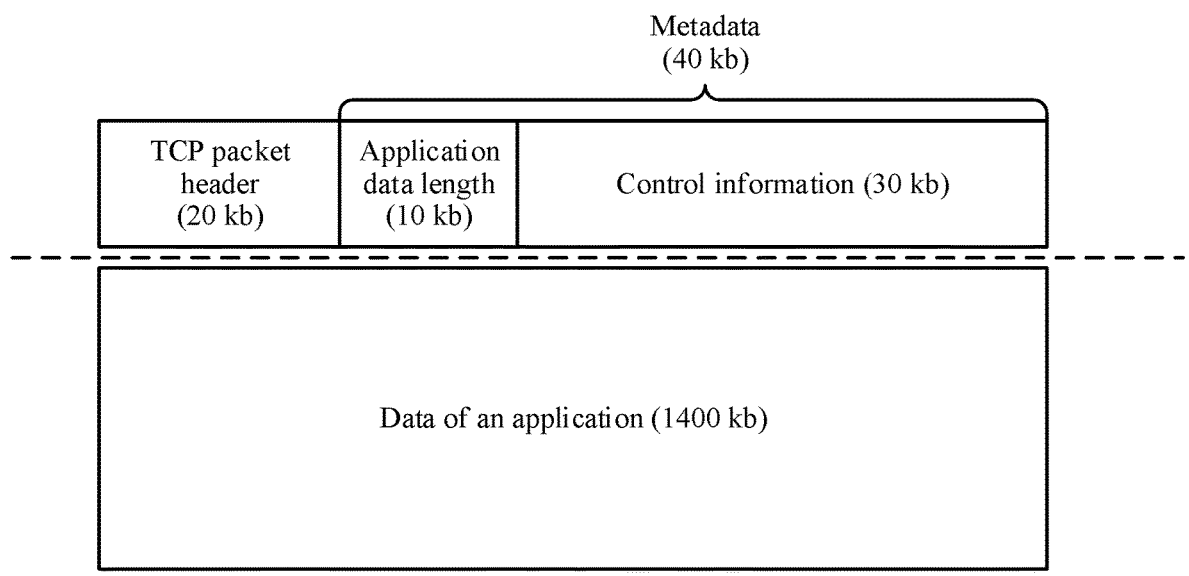
FIG. 4 is a schematic flowchart of separating data of an application from a packet in an application scenario according to this application.

For example, FIG. 4 is a schematic diagram of a packet format. In the example shown in FIG. 4, a length of metadata of data of an application 1 is 40 kb. The first 10 kb describes the length of the data of the application. For example, the length of the data of the application is 1400 kb, and the last 30 kb describes control information of the data of the application. In this case, after receiving an application processing request sent by a kernel protocol stack, the TCP application first reads, based on the length of the metadata: 40 kb, 40 kb data behind the packet header into an application memory, where the 40 kb data is the metadata of data 1 of the application, then obtains the length of the data of the application: 1400 kb based on the first 10 kb content of the metadata, and then determines the application memory address Add 1 of the data of the application based on the control information in the last 30 kb of the metadata. It should be understood that FIG. 4 is merely used as an example for description. In a specific implementation, the metadata may further include more content. Examples are not described herein one by one for description.

In the second delimitation template, if the metadata of the TCP application uniformly ends with a particular delimiter, for example, the delimiter may be a line break, a space character, or a colon, the delimitation template may obtain the metadata based on the delimiter, and then separate the data of the application from the packet based on the data length that is of the application and that is described in the metadata. Similarly, if the length of the packet header of the packet is fixed, data after the packet header and before the delimiter is the metadata. After the length L2 of the data of the application is determined based on the metadata, the data whose length is L2 after the metadata is the data of the application, so that the data of the application is separated from the packet.

It should be understood that the foregoing two delimitation templates are merely used as examples for description. In a specific implementation, delimitation templates of different TCP applications may be determined based on formats of metadata of the TCP applications. This is not specifically limited in this application.

It should be noted that, if the packets are packets on which packet aggregation processing is not performed, for example, the packets 1 to 3 in the embodiment of FIG. 5, before the packets of this type are split by using the delimitation template, packet headers need to be first identified to determine a plurality of packets belonging to a same TCP stream. Then, the delimitation template is used to split the plurality of packets in the same TCP stream, the data of the application is separated from each packet in the same TCP stream, then all the data that is of the application and that is separated from the same TCP stream is written into the network interface card driver memory 1222, and the packet headers and the metadata are both written into the application memory 1221.

Still using the three packets shown in FIG. 5 as an example, it is assumed that the length of the metadata is fixed at 40 kb, a total length of each packet is 1400 kb, and the network device 200 does not aggregate the packets 1 to 3. In this application scenario, when the first delimitation template is used for packet splitting, the network device 200 may first determine, based on the packet headers, that the packets 1 to 3 belong to a same TCP stream, and that a reading sequence of packets in the TCP stream is the packet 1, the packet 2, and the packet 3, and then read metadata in the packet 1. After determining that the length of the data 1 of the application is 3000 KB, the network device 200 reads data 1A of the application in the packet 1 (assuming that the length of the data of the application is 1000 KB). In this case, the data 1 of the application has 2000 KB unread, and data 1B of the application may be further read from the packet 2 (assuming that the length of the data of the application is 1400 KB). In this case, the data 1 of the application still has 600 KB unread, and the network device 200 may continue to read data 1C of the application from the packet 3 (assuming that the length of the data of the application is 600 KB), to obtain the data 1 that is of the application and that has a length of 3000 KB. Metadata of data 2 of the application can be obtained by continuing to read 40 kb data, and so on. Finally, the metadata 1 and the packet headers are written into the network interface card driver memory, and the data 1A of the application, the data 1B of the application, and the data 1C of the application are written into the application memory. A reading method by using the second delimitation template is similar, and details are not described herein again.

S330: The network device 200 writes the data of the application into a memory allocated in the server 100 to the application, namely, the application memory 1221 shown in FIG. 1.

In a specific implementation, the network device 200 may write the separated data of the application into the application memory 1221 by using a DMA technology. A storage address of the data of the application may be an address sent by the network interface card driver of the server to the network device 200 in advance, and the storage address is an address sent by the TCP application to the network interface card driver after the TCP application determines the address based on an idle status of the application memory 1221.

S340: The network device 200 separates the packet header and the metadata of the data of the application from the packet.

It may be understood that the packet includes a packet header, data of the application, and metadata. After the data of the application is separated by using the delimitation template in step S320, the packet header and the metadata of the data of the application may also be separated. For a specific description of the delimitation template, refer to step S320 in the foregoing content. Details are not described herein again.

S350: The network device 200 writes the packet header and the metadata of the data of the application into a memory allocated in the server 100 to the driver of the network device 200, namely, the network interface card driver memory 1222 shown in FIG. 1.

In a specific implementation, the network device 200 may write the packet header and the metadata of the data of the application into the network interface card driver memory 1222 by using the DMA technology. A storage address of the packet header and the metadata of the data of the application may be sent by the network interface card driver of the server to the network device 200 in advance, and the storage address is determined by the network interface card driver based on an idle status of the network interface card driver memory 1222.

It should be understood that step S340 and step S350 may occur simultaneously with step S320 and step S330, or may occur sequentially. This is not specifically limited in this application.

S360: The kernel protocol stack of the server 100 performs TCP protocol processing on the packet header, the metadata of the data of the application, and the data of the application, where the TCP protocol processing is used to enable the packet to include complete data in a data stream.

Specifically, the kernel protocol stack may perform out-of-order processing, congestion processing, retransmission, and the like on the packet header. If disorder occurs, the data of the application is rearranged based on the packet header. If duplicate data occurs, the duplicate data in the data of the application is discarded based on the packet header. In this way, the packet header, the data of the application, and the metadata of the data of the application after the protocol processing include all data in a same TCP data stream, to ensure that complete metadata and complete data of the application in the TCP stream are both already written into the server, thereby improving reliability of packet processing.

Still using FIG. 5 as an example, assuming that the packets 1 to 3 belong to a same TCP stream, if the network device first receives the packet 1 and the packet 2 but does not receive the packet 3, the network device aggregates the packet 1 and the packet 2 into a to-be-processed packet 11. In addition, by using a delimitation template delivered by the TCP application to the network device in advance, data X2 of the application is separated from the to-be-processed packet 11, and then the data X2 of the application is written into the application memory 1221, and the remaining packet Y1 is written into the network interface card driver memory 1222. The kernel protocol stack obtains a TCP packet header from the remaining packet Y1, and determines that the TCP stream includes three packets, and the data X2 of the application and the remaining packet Y1 that are written into the server include only the packet 1 and the packet 2. Therefore, the packet 3 needs to be retransmitted. The kernel protocol stack may send, to the network device 200, a request for retransmitting the packet 3. In response to the request, when receiving the packet 3, the network device 200 separates the data X2 of the application from the packet 3 based on the delimitation template, then writes the data X2 of the application into the application memory 1221, and writes the remaining packet Y2 into the network interface card driver memory 1222, so that the server 100 obtains all packets of the TCP stream. It should be understood that the foregoing example is merely used for description, and cannot constitute a specific limitation.

It should be noted that a data structure of the kernel protocol stack is usually a socket buffer (SKB) structure. The structure may process data of a plurality of different addresses in a form of mounting a plurality of pointer entries. For example, a pointer 1 of an SKB 1 processing the packet 1 points to the network interface card driver memory 1222. In this way, the kernel protocol stack may perform TCP protocol processing on the packet header in the network interface card driver memory by using the pointer 1. In addition, a pointer 2 of the SKB 1 may further point to the application memory 1221. The pointer 2 monitors data in the application memory 1221 to determine that the data of the application is already written into the memory, and adjusts the data of the application correspondingly when cases such as duplicate data or disorder occur in the packet header. If a packet is missed for transmission or a packet disorder occurs, a retransmission request may be sent to the network device until all packets are already written into the server. For content not described in step S330, refer to step 2 in the foregoing embodiment of FIG. 2. Details are not described herein again.

S370: The kernel protocol stack sends a confirmation request to the TCP application, where the confirmation request carries an address of the metadata of the data of the application in the network interface card driver memory and address information of the data of the application in the application memory.

S380: The TCP application determines whether the data of the application is complete data of the application in a same TCP stream, and if the data is complete data of the application, performs step S390, or if the data is not complete data of the application, performs step S311.

The TCP application may reconfirm, based on the delimitation template, whether the data of the application is complete. The delimitation template herein is the same as the delimitation template used by the network device 200 in step S310. For example, the TCP application may obtain the metadata based on the delimitation template, for example, determine the metadata based on a delimiter, or determine the metadata based on a fixed length of the metadata, and then obtain a length of the data of the application based on the metadata. If the length is the same as a length of the data that is of the application and that is written into the application memory, it indicates that the network device 200 correctly splits the packet in step S310, and can perform step S390. Otherwise, if the data length is different from the length of the data that is of the application and that is written into the application memory, it indicates that the network device 200 incorrectly splits the packet in step S310, and can perform step S311. It should be understood that the foregoing process in which the TCP application determines, based on the delimitation template, whether the network device 200 correctly splits the packet is used as an example for description. This is not limited in this application.

S390: The TCP application determines the application memory address of the data of the application based on the metadata, and exchanges a memory page corresponding to the application memory address with a memory page in which the data of the application is located.

In a specific implementation, memory page exchange may mean exchanging a pointer pointing to the data of the application with a pointer pointing to the application memory address, or replacing a virtual address of the memory page in which the data of the application is located with the application memory address. A specific implementation of memory page exchange is not limited in this application.

It may be understood that the TCP application confirms the application memory address of the data of the application based on the metadata, and then exchanges the application memory page corresponding to the application memory address with the memory page in which the data of the application is located. In this way, resource waste caused by copying the data of the application for a plurality of times is avoided, and packet processing efficiency is improved.

It should be noted that, if the storage address of the data of the application is the same as the application memory address determined based on the metadata, step S390 may not be performed, to further improve packet processing efficiency.

S311: The TCP application parses the metadata in the obtained metadata of the data of the application and the obtained data of the application, then determines the application memory address of the data of the application, and then copies the data of the application into the application memory address. For details, refer to step 3 and step 4 in the embodiment of FIG. 1. Details are not described herein again.

In an embodiment, the TCP application records a confirmation result of step S380, namely, the confirmation result of whether the network device 200 splits the packet correctly. If a quantity of consecutive split errors exceeds a threshold, the TCP application may send a re-delimitation request to the network device 200. The re-delimitation request includes information about a TCP stream to which the incorrectly split packet belongs. In response to the request, the network device 200 aggregates and splits all packets in the TCP stream again, to avoid a case in which the TCP application repeatedly performs step S370 to step S311 in a scenario of consecutive split errors, so that packet processing efficiency is further improved, and memory usage for packet processing by the server is reduced.

In a specific implementation, when sending the re-delimitation request to the network device 200, the TCP application may first send an interface invocation request to the network interface card driver. In response to the request, the network interface card driver provides an interface of the network interface card to the TCP application. The TCP application invokes the interface to deliver a synchronization command (SYNC). The SYNC command is used to forcibly write data in a memory buffer into the network device 200 immediately, so that the network device 200 performs a delimitation restart operation, to avoid a case in which the TCP application repeatedly performs step S370 to step S311 in a scenario of consecutive packet split errors, so that packet processing efficiency is further improved, and memory usage for packet processing by the server is reduced.

Still using the application scenario shown in FIG. 2 as an example, the network device 200 receives the packets 1 to 3. Assuming that the packets 1 to 3 belong to a same TCP stream, the network device 200 aggregates the packets 1 to 3 to obtain a packet 0 shown in FIG. 5. Then, a specific process of processing the packets 1 to 3 by using the foregoing steps S310 and S311 may be shown in FIG. 6.

Figure 6:
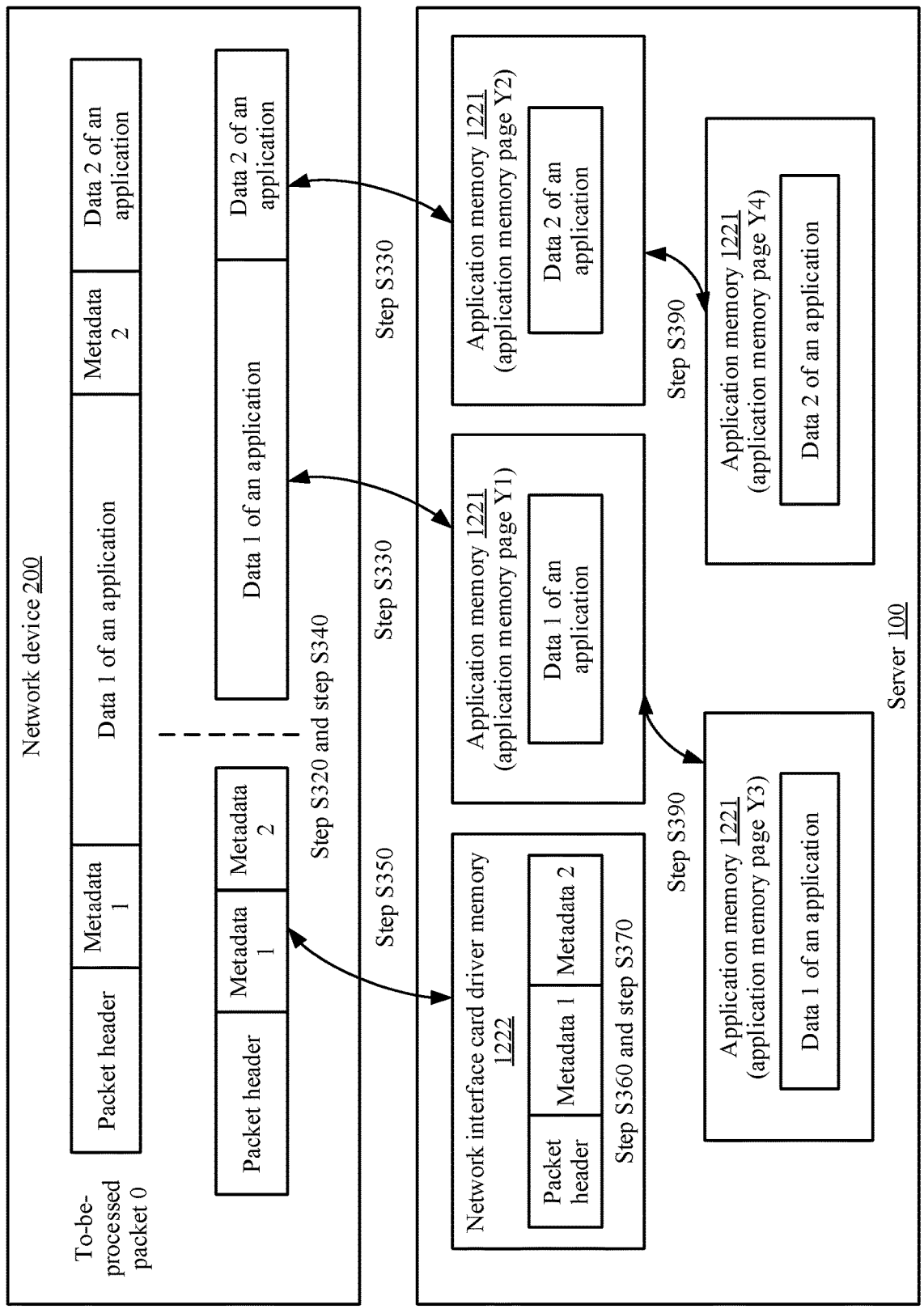
FIG. 6 is a schematic flowchart of steps of a packet processing method in an application scenario according to this application.

As shown in FIG. 6, first, based on the delimitation template by using step S320 and step S340, the network device 200 separates the data of the application from the packet 0, and separates the packet header and the metadata from the packet 0. As shown in FIG. 6, the data 1 of the application and the data 2 of the application are separated from the packet 0, and the packet header, the metadata 1, and the metadata 2 are separated from the packet 0. With reference to the foregoing content, it can be learned that the delimitation template is determined based on the format of the metadata. For example, the length of the metadata is L1, the network device 200 reads data with a length of L1 behind the packet header to obtain the metadata 1, then determines the length L2 of the data of the application based on the metadata, then reads data with a length of L2 behind the metadata 1 to obtain the data 1 of the application, then reads data with a length of L1 behind the data 1 of the application to obtain the metadata 2, determines the length L3 of the data 2 of the application based on the metadata 2, and finally reads data with a length of L3 behind the metadata 2, to obtain the data 2 of the application. It should be understood that the foregoing example is merely used for description, and cannot constitute a specific limitation.

Second, by using step S330 and S350, the network device 200 writes the data of the application into the network interface card driver memory 1222 of the server by using the DMA technology, and writes the packet header and the metadata into the application memory 1221 of the server by using the DMA technology. The data 1 of the application is written into an application memory page Y1. The data 2 of the application is written into an application memory page Y2. It should be noted that, when writing the data of the application into the application memory 1221, the network device 200 may write different data of the application into different application memory pages, as shown in FIG. 6, or may write all the data of the application into a same application memory page. That is, both the data 1 of the application and the data 2 of the application are written into the application memory page Y1 or the application memory page Y2. This may be specifically determined based on a processing logic of the TCP application. This is not limited in this application.

Finally, the server 100 performs step S360 to perform processing, such as out-of-order processing and retransmission, on the packet header in the network interface card driver memory 1222, rearranges out-of-order data, and discards duplicate data. After ensuring that both the complete metadata and the complete data of the application in the TCP stream are already written into the server, step S370 is performed to send a confirmation request to the TCP application. The TCP application responds to the confirmation request. After performing step S380 based on the delimitation template to determine that the data that is of the application and that is written into the application memory is complete data of the application in the same TCP stream, the TCP application performs step S390 to determine, based on the metadata 1, the application memory page Y3 corresponding to the application memory address of the data 1 of the application. Then, the application memory page Y1 in which the data 1 of the application is located is exchanged with the application memory page Y3, the application memory page Y4 of the data 2 of the application is determined based on the metadata 2, and the application memory page Y2 in which the data 2 of the application is located is exchanged with the application memory page Y4, to complete one packet processing process. In this process, the data of the application does not need to be copied repeatedly, so that memory usage for TCP packet processing by the server is reduced, and packet processing efficiency is improved.

Figure 7:
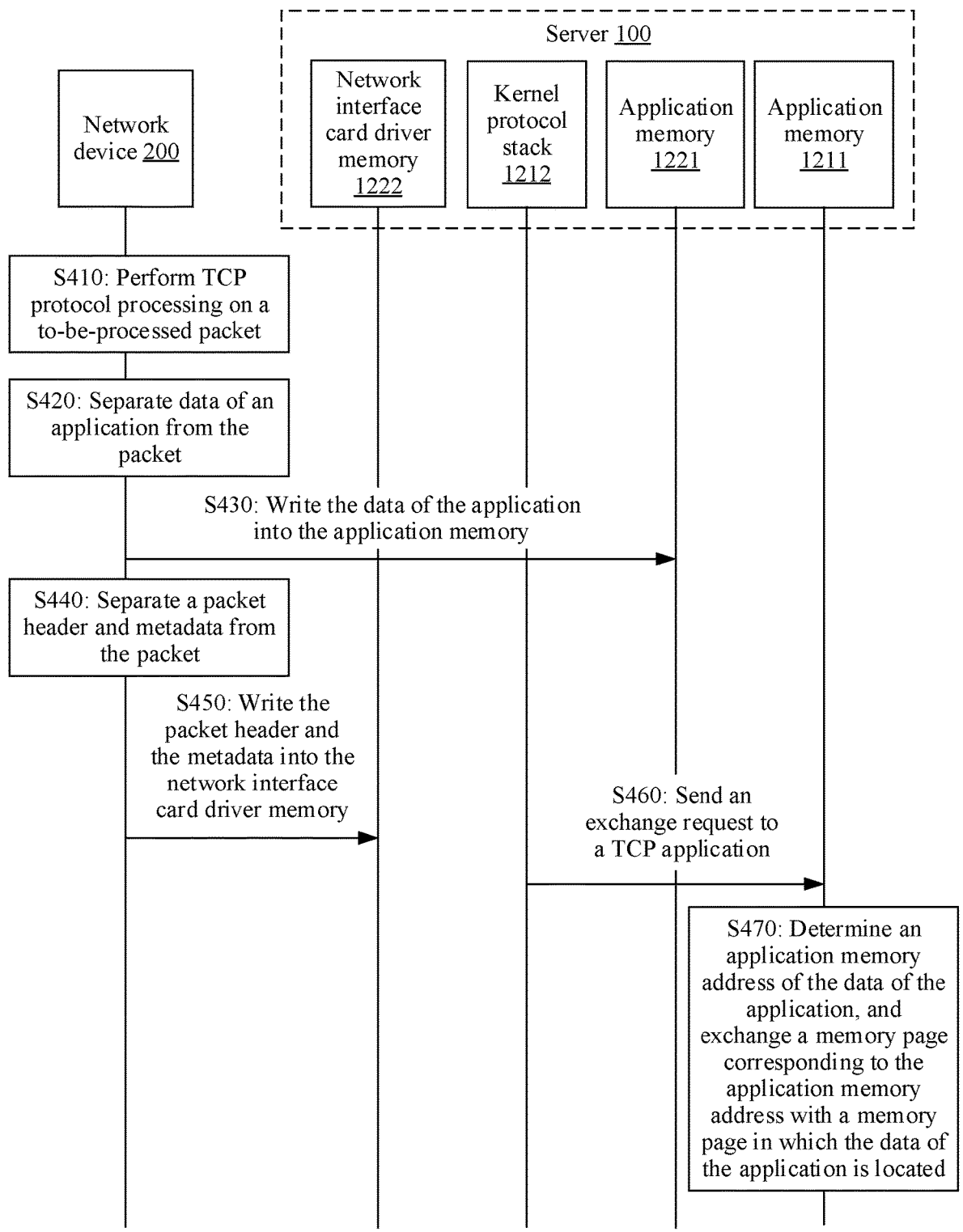
FIG. 7 is a schematic flowchart of steps of a packet processing method according to this application.

With reference to the foregoing content, it can be learned that, to reduce processing pressure of the server, some network devices 200 support a TOE function. This function enables the network device 200 to first perform TCP protocol processing on the packet after receiving the packet, and then write a processed complete TCP stream into the server 100. A specific process of using the packet processing method provided in this application for the TOE network interface card of this type may be shown in FIG. 7.

S410: The network device 200 performs TCP protocol processing, such as out-of-order processing, retransmission, and congestion processing, on a to-be-processed packet of an application running in the server 100, so that the to-be-processed packet includes complete data in one data stream. For specific descriptions, refer to step S360 in the foregoing content. Details are not described herein again. The network device 200 may be a TOE network interface card supporting a TOE function.

In a specific implementation, the packet of the application running in the server 100 may be a single sub-packet, for example, the packet 1 to the packet 3 in the embodiment of FIG. 5, or may be a to-be-processed packet obtained by aggregating a plurality of received sub-packets by the network device 200, for example, the packet 0 in the embodiment of FIG. 5. It should be noted that, after performing TCP protocol processing on all received packets, the network device 200 may aggregate a plurality of sub-packets belonging to a same TCP stream into a packet, or may aggregate the plurality of received sub-packets into the to-be-processed packet, and then perform TCP protocol processing on the to-be-processed packet. This is not limited in this application. For specific descriptions of the TCP protocol processing, refer to step 2, step S330, and the like in the foregoing content. Details are not described herein again.

S420: The network device 200 separates data of the application from the packet.

In a specific implementation, the network device 200 may separate the data of the application from the packet based on the delimitation template. The delimitation template is a template delivered to the network device 200 by invoking an interface of a network interface card driver before step S410 by the TCP application in the server 100. For description of the delimitation template, refer to step S310 in the foregoing content. Details are not described herein again.

It should be understood that, because the network device 200 supports the TOE function, and TCP protocol processing is already performed on the packet in step S420, cases such as disorder and repetition do not occur in the packet, and a case of a split error does not occur in data that is of the application and that is separated from the packet by using the delimitation template.

S430: The network device 200 writes the data of the application into a memory allocated in the server to the application, where the memory may be specifically the application memory 1221. For description of this step, refer to step S330 in the foregoing content. Details are not described herein again. In a specific implementation, the network device 200 may write the data of the application into the application memory 1221 by using a DMA technology.

S440: Separate a packet header and metadata of the data of the application from the packet. For specific description of this step, refer to step S340 in the foregoing content. Details are not described herein again.

S450: Write the packet header and the metadata of the data of the application into the memory allocated by the server to a driver of the network device, where the memory may be specifically the network interface card driver memory 1222. In a specific implementation, the network device 200 may write the packet header and the metadata of the data of the application into the network interface card driver memory 1222 by using the DMA technology. For description of this step, refer to step S350 in the foregoing content. Details are not described herein again.

S460: The kernel protocol stack sends an exchange request to the TCP application, where the exchange request includes an address of the data that is of the application and that is obtained through separation and an address of the metadata that is obtained through separation. For details, refer to step S370 in the foregoing content. Details are not described herein again.

S470: The TCP application determines the application memory address of the data of the application based on the metadata, and exchanges a memory page in which the data of the application is located with the memory page corresponding to the application memory address. Specifically, the TCP application may obtain the metadata based on the address that is of the metadata and that is in the exchange request, and then determine the application memory address of the data of the application based on the metadata. For specific descriptions of determining the application memory address of the data of the application based on the metadata and of the memory page exchange, refer to step S390 in the foregoing content. Details are not described herein again.

It should be understood that, if the application memory address is the same as the memory address in which the separated data of the application is located, memory page exchange may not be performed any more, to further improve packet processing efficiency.

Optionally, before determining the application memory address of the data of the application based on the metadata, the TCP application may confirm for the second time, by using the delimitation template, whether the network device 200 splits the packet correctly, and if the network device 200 splits the packet correctly, the TCP application determines the application memory address of the data of the application based on the metadata, and exchanges the memory page in which the data of the application is located with the memory page corresponding to the application memory address, to avoid a case in which the TCP application obtains incorrect data after the memory page exchange due to another reason, for example, the data of the application is incomplete due to a DMA error, thereby further improving reliability of the packet processing method provided in this application.

In conclusion, it can be learned that, according to the packet processing method provided in this application, the server delivers the delimitation template to the network device in advance, so that before sending the packet to the server, the network device first splits the data of the application and the metadata from the packet by using the delimitation template, and writes the metadata into the network interface card driver memory, and writes the data of the application into the application memory. In this way, the TCP application of the server determines the application memory address of the data of the application based on the metadata in the network interface card driver memory, and then exchanges the memory page in which the data of the application is located with the memory page corresponding to the application memory address, to complete one data communication process. In this method, a case of a plurality of times of copying is avoided in a process in which the packet is transmitted from the network device to the memory page of the TCP application, to improve packet processing efficiency and reduce memory usage.

The method in embodiments of this application is described in detail above. To better implement the foregoing solutions in embodiments of this application, correspondingly, the following further provides related devices configured to collaboratively implement the foregoing solutions.

Figure 8:
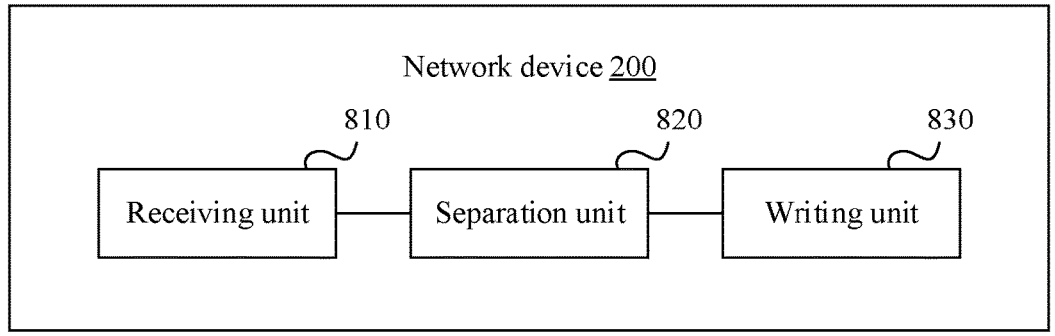
FIG. 8 is a schematic diagram of a structure of a network device according to this application.

FIG. 8 is a schematic diagram of a structure of a network device 200 according to this application. The network device 200 is applied to the packet processing system shown in FIG. 1. The network device 200 is connected to a server 100. As shown in FIG. 8, the network device 200 may include a receiving unit 810, a separation unit 820, and a writing unit 830.

The receiving unit 810 is configured to receive a packet of an application running in the server. For a specific implementation, refer to the detailed descriptions of step S310 in the embodiment shown in FIG. 3A and FIG. 3B and step S410 in the embodiment of FIG. 4. Details are not described herein.

The separation unit 820 is configured to separate data of the application from the packet. For a specific implementation, refer to the detailed descriptions of step S320 in the embodiment of FIG. 3A and FIG. 3B and step S420 in the embodiment of FIG. 4. Details are not described herein.

The writing unit 830 is configured to write the data of the application into a memory allocated in the server to the application. For a specific implementation, refer to the detailed descriptions of step S330 in the embodiment of FIG. 3A and FIG. 3B and step S430 in the embodiment of FIG. 4. Details are not described herein.

In an embodiment, the separation unit 820 is further configured to separate a packet header and metadata of the data of the application from the packet; and the writing unit is further configured to store the packet header and the metadata of the data of the application into a memory allocated by the server to a driver of the network device. For a specific implementation, refer to the detailed descriptions of step S340 and step S350 in the embodiment of FIG. 3A and FIG. 3B and step S440 and step S450 in the embodiment of FIG. 4. Details are not described herein.

In an embodiment, the separation unit 820 is configured to separate the data of the application from the packet based on a delimitation template, where the delimitation template defines a rule of separation between the data of the application and other data in the packet. For a specific implementation, refer to the detailed description of the step in which the network device 200 separates the data of the application from the packet by using the delimitation template in step S310 in the embodiment of FIG. 3A and FIG. 3B and step S420 in the embodiment of FIG. 4. Details are not described herein.

In an embodiment, the receiving unit 810 is configured to aggregate a plurality of sub-packets belonging to a same data stream into the packet, where source internet protocol IP addresses and destination IP addresses of the plurality of sub-packets belonging to the same data stream are the same. For a specific implementation, refer to the detailed description of the packet aggregation step in step S310 in the embodiment of FIG. 3A and FIG. 3B and step S410 in the embodiment of FIG. 4. Details are not described herein.

In an embodiment, when the network device 200 is a network interface card supporting a TOE function, the network device 200 further includes a determining unit 840. The determining unit 840 is configured to determine that the packet includes complete data in one data stream before the separation unit separates the data of the application from the packet. Specifically, TCP protocol processing, for example, congestion control, retransmission, and out-of-order processing may be performed on the packet. For a specific implementation, refer to step S410 in the embodiment of FIG. 4. Details are not described herein.

It should be understood that unit modules inside the network device 200 shown in FIG. 8 may also be divided in a plurality manners. The modules may be software modules, hardware modules, or some software modules and some hardware modules. This is not limited in this application. FIG. 8 shows an example division manner. This is not specifically limited in this application.

It may be understood that, the network device provided in this application may receive, in advance, the delimitation template delivered by the server, so that before sending the packet to the server, the network device first splits the data of the application and the metadata from the packet by using the delimitation template, and writes the metadata into the network interface card driver memory, and writes the data of the application into the application memory. In this way, a TCP application of the server determines an application memory address of the data of the application based on the metadata in the network interface card driver memory, and then exchanges a memory page in which the data of the application is located with a memory page corresponding to the application memory address, to complete one data communication process. In this method, a case of a plurality of times of copying is avoided in a process in which the packet is transmitted from the network device to the memory page of the TCP application, to improve packet processing efficiency and reduce memory usage.

Figure 9:
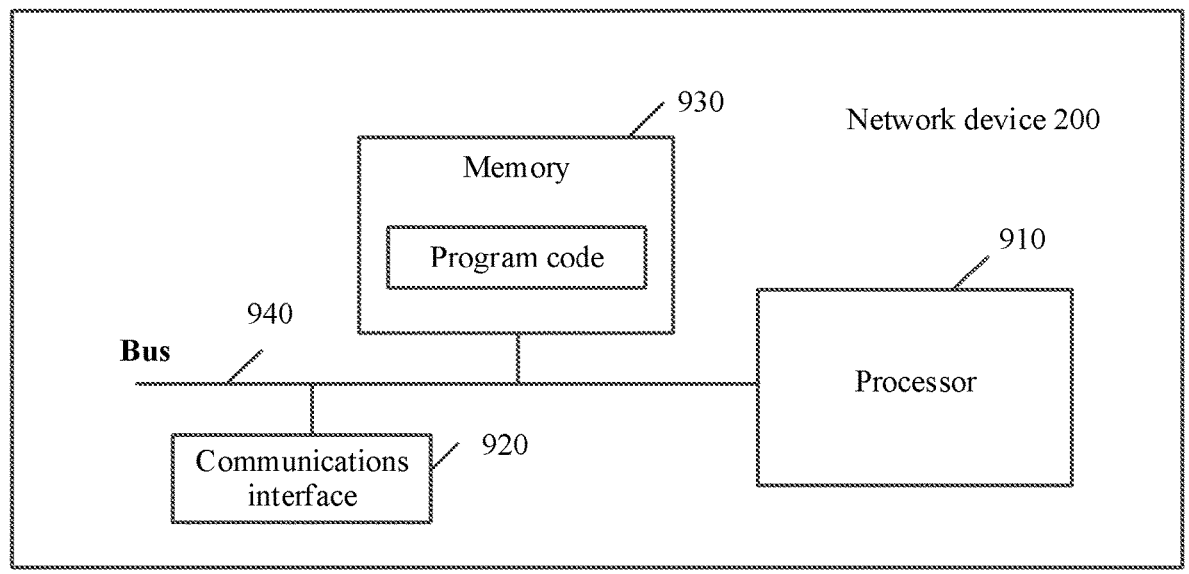
FIG. 9 is a schematic diagram of a structure of hardware of a network device according to this application.

FIG. 9 is a schematic diagram of a structure of hardware of a network device 200 according to this application. As shown in FIG. 9, the network device 200 includes a processor 910, a communications interface 920, and a memory 930. The processor 910, the communications interface 920, and the memory 930 may be connected to each other by using the internal bus 940, or may implement communication by using another means such as wireless transmission. In this embodiment of this application, an example in which connection is performed by using the bus 940 is used. The bus 940 may be a peripheral component interconnect (PCI) bus, an extended industry standard architecture (EISA) bus, or the like. The bus 940 may be classified into an address bus, a data bus, a control bus, and the like. For ease of representation, only one thick line is used to represent the bus in FIG. 9, but this does not mean that there is only one bus or only one type of bus.

The processor 910 may include at least one general-purpose processor, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 910 executes various types of digital storage instructions, such as software or firmware programs stored in the memory 930, and can enable the network device 200 to provide a wide variety of services.

The memory 930 is configured to store program code, and the processor 910 controls execution, to perform processing steps of the network device 200 in any embodiment in FIG. 1 to FIG. 7. The program code may include one or more software modules. The one or more software modules may be software modules provided in the embodiment shown in FIG. 8, such as the receiving unit, the separation unit, and the writing unit. The receiving unit may be configured to receive a packet of an application running in a server. The separation unit may be configured to separate data of the application from the packet. The writing unit is configured to write the data of the application into a memory allocated in the server to the application. The one or more software modules may be specifically configured to perform step S310 to step S350, step S410 to step S450 and optional steps thereof in the foregoing method, and may be further configured to perform other steps performed by the network device 200 described in the embodiments of FIG. 2 to FIG. 7. Details are not described herein again.

The memory 930 may include a volatile memory, for example, a random access memory (RAM). The memory 1030 may also include a non-volatile memory, for example, a read-only memory (ROM), a flash memory, a hard disk drive (HDD), or a solid-state drive (SSD). The memory 930 may further include a combination of the foregoing types. The memory 930 may store program code, and specifically may include program code used by the processor 910 to perform other steps described in the embodiments of FIG. 2 to FIG. 7. Details are not described herein again.

The communications interface 920 may be a wired interface (for example, an Ethernet interface), or may be an internal interface (for example, a high-speed serial computer extended bus (PCIe) bus interface), a wired interface (for example, an Ethernet interface), or a wireless interface (for example, a cellular network interface or a wireless local area network interface), and is configured to communicate with another server or module. In a specific implementation, the communications interface 920 may be configured to receive a packet, so that the processor 910 processes the packet.

It should be noted that FIG. 9 is merely a possible implementation of embodiments of this application. During actual application, the network device may further include more or fewer components. This is not limited herein. For content that is not shown or described in this embodiment of this application, refer to related descriptions in the embodiments of FIG. 2 to FIG. 7. Details are not described herein again.

An embodiment of this application further provides a computer-readable storage medium. The computer-readable storage medium stores instructions. When the instructions run on a processor, the method flow shown in FIG. 2 to FIG. 7 can be implemented.

An embodiment of this application further provides a computer program product. When the computer program product runs on a processor, the method flow shown in FIG. 2 to FIG. 7 can be implemented.

All or some of the foregoing embodiments may be implemented by using software, hardware, firmware, or any combination thereof. When software is used to implement embodiments, all or some of the foregoing embodiments may be implemented in a form of a computer program product. The computer program product includes at least one computer instruction. When the computer program instructions are loaded and executed on a computer, all or some of the procedures or functions according to embodiments of the present application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, including at least one usable medium set. The usable medium may be a magnetic medium (for example, a floppy disk, a hard disk, or a magnetic tape), an optical medium (for example, a high density digital video disc (DVD)), or a semiconductor medium. The semiconductor medium may be an SSD.

The foregoing descriptions are merely specific embodiments of the present application, but are not intended to limit the protection scope of the present application. Any equivalent modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for packet processing performed by a network device, the method comprising:
   receiving a packet of an application running in a server connected to the network device;
   separating data of the application from the packet;
   writing the data of the application into a memory allocated in the server to the application;
   separating a packet header and metadata of the data of the application from the packet; and
   storing the packet header and the metadata of the data of the application into a memory allocated by the server to a driver of the network device.

2. The method according to claim 1, wherein the step of separating separates the data of the application from the packet based on a delimitation template, wherein the delimitation template defines a rule of separation between the data of the application and other data in the packet.

3. The method according to claim 2, wherein the application is a TCP application.

4. The method according to claim 3, wherein the rule of separation defined in the delimitation template is: the metadata of the TCP application uniformly ends with a particular delimiter.

5. The method according to claim 3, wherein the rule of separation defined in the delimitation template is: a length of the metadata of the TCP application is uniform L1, and a length of the packet header of the packet is fixed.

6. The method according to claim 1, wherein the step of receiving the packet of the application comprises:
   aggregating a plurality of sub-packets belonging to a same data stream into the packet, wherein source internet protocol (IP) addresses and destination IP addresses of the plurality of sub-packets belonging to the same data stream are the same.

7. The method according to claim 1, wherein before the step of separating the data of the application from the packet, the method further comprises:
   determining that the packet comprises complete data in one data stream.

8. A network device comprising:
   a memory storing executable instructions; and
   a processor coupled to the memory and configured to execute the executable instructions to:
   receive, from a server connected to the network device, a packet of an application running in the server;
   separate data of the application from the packet;
   write the data of the application into a memory allocated in the server to the application;
   separate a packet header and metadata of the data of the application from the packet; and
   store the packet header and the metadata of the data of the application into a memory allocated by the server to a driver of the network device.

9. The network device according to claim 8, wherein the processor is configured to separate the data of the application from the packet based on a delimitation template, wherein the delimitation template defines a rule of separation between the data of the application and other data in the packet.

10. The network device according to claim 9, wherein the application is a Transmission Control Protocol (TCP) application.

11. The network device according to claim 10, wherein the rule of separation defined in the delimitation template is: the metadata of the TCP application uniformly ends with a particular delimiter.

12. The network device according to claim 10, wherein the rule of separation defined in the delimitation template is: a length of the metadata of the TCP application is uniform L1, and a length of the packet header of the packet is fixed.

13. The network device according to claim 8, wherein the processor is configured to receive the packet of the application running in the server by aggregating a plurality of sub-packets belonging to a same data stream into the packet, wherein source internet protocol (IP) addresses and destination IP addresses of the plurality of sub-packets belonging to the same data stream are the same.

14. The network device according to claim 8, wherein before separating the data of the application from the packet, the processor is configured to:

determine that the packet comprises complete data in one data stream.

* * * * *